United States Patent
Sakurai et al.

(10) Patent No.: US 10,333,317 B2
(45) Date of Patent: Jun. 25, 2019

(54) CHARGE/DISCHARGE CONTROL CIRCUIT AND BATTERY DEVICE

(71) Applicant: SII Semiconductor Corporation, Chiba-shi, Chiba (JP)

(72) Inventors: Atsushi Sakurai, Chiba (JP); Takashi Ono, Chiba (JP); Kazuhide Yasuda, Chiba (JP)

(73) Assignee: ABLIC INC., Chiba-Shi (JP)

( * ) Notice: Subject to any disclaimer, the term of this patent is extended or adjusted under 35 U.S.C. 154(b) by 0 days.

(21) Appl. No.: 15/791,707

(22) Filed: Oct. 24, 2017

(65) Prior Publication Data
US 2018/0183246 A1  Jun. 28, 2018

(30) Foreign Application Priority Data

Dec. 28, 2016 (JP) ................. 2016-255308
Jun. 27, 2017 (JP) ................. 2017-125291

(51) Int. Cl.
*H02J 7/00* (2006.01)

(52) U.S. Cl.
CPC .......... *H02J 7/0021* (2013.01); *H02J 7/0026* (2013.01)

(58) Field of Classification Search
CPC .................................................. H02J 7/0021
USPC ........................................................ 320/134
See application file for complete search history.

(56) References Cited

U.S. PATENT DOCUMENTS

| | | | | |
|---|---|---|---|---|
| 5,547,775 A | * | 8/1996 | Eguchi ............. | G01R 19/16542 320/116 |
| 7,521,896 B2 | * | 4/2009 | Yudahira et al. ........... | G01R 19/16542 320/104 |
| 7,710,120 B2 | * | 5/2010 | Yudahira et al. ........... | G01R 19/16542 320/104 |
| 9,647,466 B2 | * | 5/2017 | Kubo et al. ............. | B60L 11/18 |
| 2009/0179617 A1 | | 7/2009 | Koike et al. | |
| 2010/0001737 A1 | * | 1/2010 | Kubo et al. ............. | B60L 11/18 324/434 |
| 2010/0215994 A1 | * | 8/2010 | Kim et al. ............ | H01M 10/46 429/7 |
| 2011/0293998 A1 | * | 12/2011 | Sato et al. .......... | H01M 2/1077 429/159 |

(Continued)

FOREIGN PATENT DOCUMENTS

JP    2009-159811 A    7/2009

*Primary Examiner* — Sun J Lin

(74) *Attorney, Agent, or Firm* — Brinks Gilson & Lione

(57) ABSTRACT

In order to provide a charge/discharge control circuit capable of controlling a charge/discharge current of secondary batteries that are connected in parallel, the charge/discharge control circuit includes: a first power supply terminal and a second power supply terminal to which a respective first electrode of each of secondary batteries which are connected in parallel is connected; a third power supply terminal to which second electrodes of the secondary batteries are connected; a connection circuit configured to connect the first power supply terminal and the second power supply terminal to generate an electric potential for an output; and a controller configured to operate on a potential difference between the electric potential supplied from the connection circuit and an electric potential supplied from the third power supply terminal, and to control charging/discharging of the first secondary battery and the second secondary battery.

8 Claims, 3 Drawing Sheets

(56) References Cited

U.S. PATENT DOCUMENTS

2014/0009117 A1* 1/2014 Ishii et al. ................ H02J 7/34
                                                                             320/126

* cited by examiner

CHARGE/DISCHARGE CONTROL CIRCUIT AND BATTERY DEVICE

RELATED APPLICATIONS

This application claims priority under 35 U.S.C. § 119 to Japanese Patent Applications No. 2016-255308 filed on Dec. 28, 2016 and No. 2017-125291 filed on Jun. 27, 2017, the entire content of which are hereby incorporated by reference.

BACKGROUND OF THE INVENTION

1. Field of the Invention

The present invention relates to a charge/discharge control circuit and a battery device.

2. Description of the Related Art

Hitherto, there has been known a battery device that includes a charge/discharge control circuit (or a battery state monitoring circuit) having a controller (or a control circuit), and a plurality of secondary batteries. The battery device described, for example, in Japanese Patent Application Laid-open No. 2009-159811 uses the controller of the charge/discharge control circuit to control a charge/discharge current of the plurality of secondary batteries connected in series.

In the battery device described in Japanese Patent Application Laid-open No. 2009-159811, the plurality of secondary batteries are connected in series. However, parallel connection of the plurality of secondary batteries can be instead thought of.

In the battery device described in Japanese Patent Application Laid-open No. 2009-159811, the controller of the charge/discharge control circuit operates on a charge/discharge current of the secondary batteries. The controller of the charge/discharge control circuit may, however, lose the control of charging/discharging when an abnormality such as fall-off or an internal open-circuit failure of a secondary battery takes place in one of the plurality of secondary batteries because the plurality of secondary batteries are connected in series.

In the battery device described in Japanese Patent Application Laid-open No. 2009-159811, an abnormality in one of the secondary batteries cuts off the connection between the rest of the secondary batteries and an external terminal (output terminal). The loss of charge/discharge control by the controller of the charge/discharge control circuit therefore does not particularly cause a problem.

In the case of parallel connection of the plurality of secondary batteries, however, an abnormality in one of the secondary batteries does not lead to the cutting off of the connection between the rest of the secondary batteries and an external terminal (output terminal). The loss of charge/discharge control by the controller of the charge/discharge control circuit in the case of parallel connection of the plurality of secondary batteries may accordingly render the battery device unstable when an abnormality occurs in one of the plurality of secondary batteries.

SUMMARY OF THE INVENTION

It is an object of the present invention to provide a charge/discharge control circuit and a battery device in which a controller is capable of controlling a charge/discharge current despite an abnormality in one of a plurality of secondary batteries connected in parallel.

According to one embodiment of the present invention, there is provided a charge/discharge control circuit comprising: a first power supply terminal to which a first electrode of a first secondary battery is connected; a second power supply terminal to which a first electrode of a second secondary battery is connected, the second secondary battery being connected in parallel to the first secondary battery; a third power supply terminal to which second electrodes of the first secondary battery and the second secondary battery are connected; a connection circuit configured to connect the first power supply terminal and the second power supply terminal, and to output an electric potential that is generated after the connection; and a controller configured to operate on a power supply voltage that is a potential difference between the electric potential output from the connection circuit and an electric potential supplied from the third power supply terminal, and to control charging/discharging of the first secondary battery and the second secondary battery.

According to the charge/discharge control circuit of the present invention, the controller is capable of controlling a charge/discharge current despite an abnormality in one of the plurality of secondary batteries connected in parallel sine the connection circuit is included between the controller and the power supply terminals.

DETAILED DESCRIPTION OF THE PREFERRED EMBODIMENTS

First Embodiment

Referring to the accompanying drawings, a charge/discharge control circuit 10 according to the first embodiment of the present invention is described below.

Figure 1:
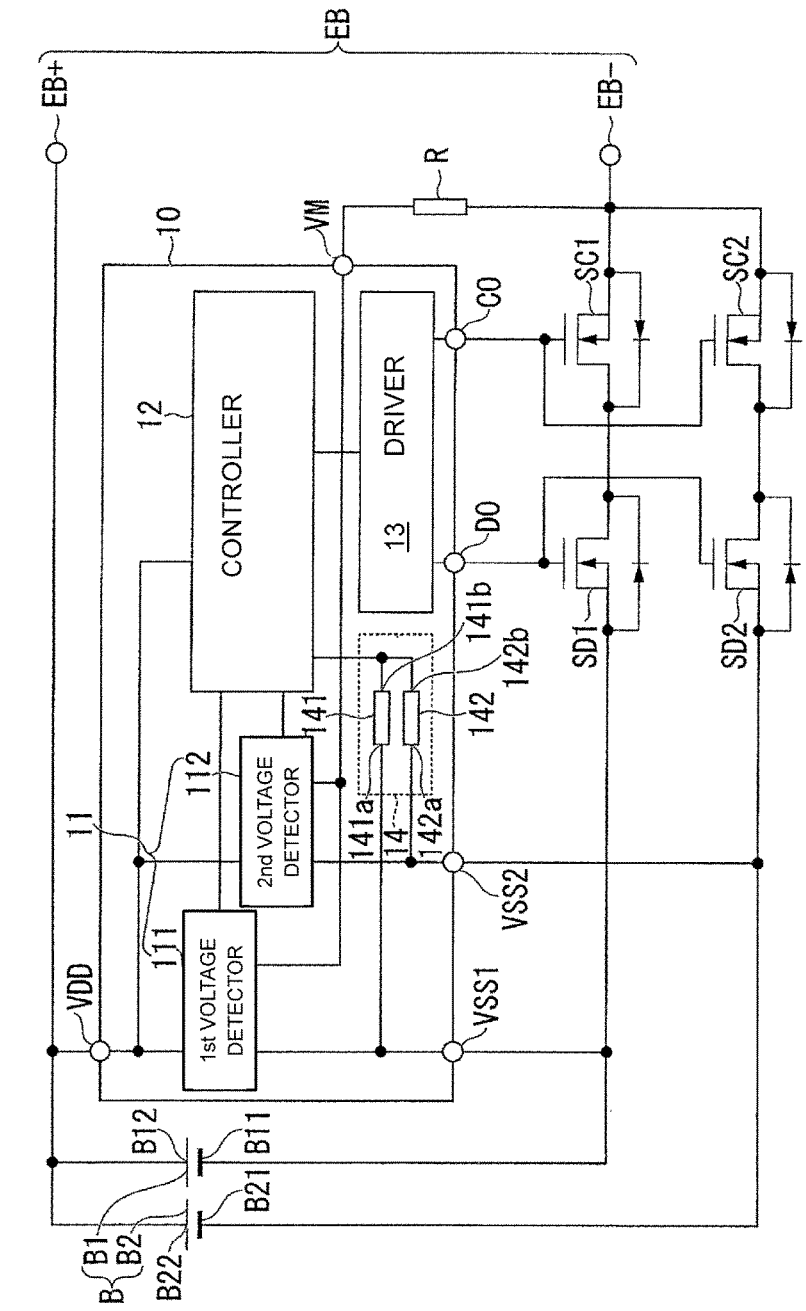
FIG. 1 is a diagram for illustrating a functional configuration of a battery device to which a charge/discharge control circuit according to the first embodiment of the present invention is applied.

FIG. 1 is a diagram for illustrating the function configuration of a battery device 1 to which the charge/discharge control circuit 10 according to the first embodiment is applied.

The battery device 1 includes the charge/discharge control circuit 10, a first secondary battery B1, a second secondary battery B2, a first external terminal EB+, a second external terminal EB−, a discharge control switch SD1, a charge control switch SC1, a discharge control switch SD2, a charge control switch SC2, and a resistor R.

The first secondary battery B1 and the second secondary battery B2 form a secondary battery B. The first secondary battery B1 includes a first electrode B11 and a second electrode B12. The second secondary battery B2 includes a first electrode B21 and a second electrode B22.

The first external terminal EB+ and the second external terminal EB− form an external terminal EB.

The discharge control switch SD1 and the charge control switch SC1 form a first charge/discharge control switch. The discharge control switch SD2 and the charge control switch SC2 form a second charge/discharge control switch.

The battery device 1 is configured to supply power that is charged in the secondary battery B to the outside via the external terminal EB, and to charge the secondary battery B with power supplied from the outside via the external terminal EB. The battery device 1 includes the secondary battery B having a necessary number of parallel connections.

The charge/discharge control circuit 10 includes a first power supply terminal VSS1, a second power supply terminal VSS2, a third power supply terminal VDD, a discharge control terminal DO, a charge control terminal CO, an overcurrent detection terminal VM, a first voltage detector 111, a second voltage detector 112, a connection circuit 14, a controller 12, and a driver 13.

The first voltage detector 111 and the second voltage detector 112 form a voltage detector 11. The connection circuit 14 includes a first resistor 141 and a second resistor 142. The first resistor 141 includes a first terminal 141a and a second terminal 141b. The second resistor 142 includes a first terminal 142a and a second terminal 142b.

The first external terminal EB+ is connected to the second electrode B12 of the first secondary battery B1, the second electrode B22 of the second secondary battery B2, and the third power supply terminal VDD of the charge/discharge control circuit 10. The first electrode B11 of the first secondary battery B1 is connected to the first power supply terminal VSS1 of the charge/discharge control circuit 10 and one terminal of the discharge control switch SD1. The first electrode B21 of the secondary battery B2 is connected to the second power supply terminal VSS2 of the charge/discharge control circuit 10 and one terminal of the discharge control switch SD2. The other terminal of the discharge control switch SD1 is connected to one terminal of the charge control switch SC1, and a signal from the discharge control terminal DO is used to control the discharge control switch SD1. The other terminal of the discharge control switch SD2 is connected to one terminal of the charge control switch SC2, and a signal from the discharge control terminal DO is used to control the discharge control switch SD2. The other terminal of the charge control switch SC1 is connected to the second external terminal EB−, and a signal from the charge control terminal CO is used to control the charge control switch SC1. The other terminal of the charge control switch SC2 is connected to the second external terminal EB−, and a signal from the charge control terminal CO is used to control the charge control switch SC2. The overcurrent detection terminal VM is connected to the second external terminal EB− via the resistor R.

The first voltage detector 111 is connected to the first power supply terminal VSS1, the third power supply terminal VDD, the overcurrent detection terminal VM, and the controller 12. The second voltage detector 112 is connected to the second power supply terminal VSS2, the third power supply terminal VDD, the overcurrent detection terminal VM, and the controller 12. In the first resistor 141 of the connection circuit 14, the first terminal 141a is connected to the first power supply terminal VSS1 and the second terminal 141b is connected to the controller 12. In the second resistor 142 of the connection circuit 14, the first terminal 142a is connected to the second power supply terminal VSS2 and the second terminal 142b is connected to the controller 12. The controller 12 is connected to the driver 13. The driver 13 is connected to the discharge control terminal DO and the charge control terminal CO.

The first voltage detector 111 is configured to detect the voltage of the first secondary battery B1 based on the electric potential of the first power supply terminal VSS1 and the electric potential of the third power supply terminal VDD. The first voltage detector 111 in the example of FIG. 1 also detects an overcurrent flowing in the first charge/discharge control switch, based on a voltage applied between the first power supply terminal VSS1 and the overcurrent detection terminal VM.

The second voltage detector 112 is configured to detect the voltage of the second secondary battery B2 based on the electric potential of the second power supply terminal VSS2 and the electric potential of the third power supply terminal VDD. The second voltage detector 112 in the example of FIG. 1 also detects an overcurrent flowing in the second charge/discharge control switch, based on a voltage applied between the second power supply terminal VSS2 and the overcurrent detection terminal VM.

The connection circuit 14 is configured to connect the first power supply terminal VSS1 and the second power supply terminal VSS2 to each other via the first resistor 141 and the second resistor 142, and to output to the controller 12 an electric potential that is generated after the connection.

The controller 12 is configured to output a signal that is used to control a charge/discharge current to/from the first secondary battery B1 and the second secondary battery B2, based on the result of detection by the first voltage detector 111 and the result of detection by the second voltage detector 112. The controller 12 operates on a power supply voltage that is a potential difference between the electric potential output from the connection circuit 14 and the electric potential supplied from the third power supply terminal VDD.

The driver 13 is configured to output, from the charge control terminal CO, a signal that is used to control the charge control switch SC1 and the charge control switch SC2, and, from the discharge control terminal DO, a signal that is used to control the discharge control switch SD1 and the discharge control switch SD2, based on a signal output by the controller 12.

The charge control switch SC1 is configured to control a charge current for charging the first secondary battery B1. The charge control switch SC2 is configured to control a charge current for charging the second secondary battery B2. The discharge control switch SD1 is configured to control a discharge current that is discharged by the first secondary battery B1. The discharge control switch SD2 is configured to control a discharge current that is discharged by the second secondary battery B2.

In the following description, the switches may collectively be referred to as "control switches". The charge control switch SC1 and the charge control switch SC2 may collectively be referred to as "charge control switches". The discharge control switch SD1 and the discharge control switch SD2 may collectively be referred to as "discharge control switches".

Every one of the control switches is, for example, an FET switch, and is switched on or off under control of the charge/discharge control circuit 10.

The controller 12 controls the charging/discharging of the secondary batteries B by controlling the control switches via the driver 13 based on the result of detection that is performed by the voltage detector 11.

An example of control exerted by the controller 12 is described below.

The controller 12 controls the control switches so that each control switch is switched on when the detection result of the voltage detector 11 indicates a "normal state".

When the detection result of the first voltage detector 111 indicates "overcharging", that is, when the first secondary battery B1 is overcharged, the controller 12 controls the charge control switches to be off, cutting off a charge current to the secondary battery B to stop the charging.

When the detection result of the first voltage detector 111 indicates "overdischarging", that is, when the first secondary battery B1 is overdischarged, the controller 12 controls the discharge control switches to be off, cutting off a discharge current from the secondary battery B to stop the discharging.

When the detection result of the second voltage detector 112 indicates "overcharging", that is, when the second secondary battery B2 is overcharged, the controller 12 controls the charge control switches to be off, cutting off a charge current to the secondary battery B to stop the charging.

When the detection result of the second voltage detector 112 indicates "overdischarging", that is, when the second secondary battery B2 is overdischarged, the controller 12 controls the discharge control switches to be off, cutting off a discharge current from the secondary battery B to stop the discharging.

A case is described in which a failure in the battery device 1 makes it impossible to supply an electric potential to one of the first power supply terminal VSS1 and the second power supply terminal VSS2.

The description takes as an example a case in which an electric potential can no longer be supplied to the second power supply terminal VSS2 due to the breaking of a conductive wire connected to the first electrode B21 of the second secondary battery B2.

The electric potential of the first electrode B21 in the second secondary cell B2 is not supplied to the second power supply terminal VSS2 of the charge/discharge control circuit 10. The connection circuit 14 deals with this by outputting the electric potential of the first power supply terminal VSS1. The controller 12 consequently operates on a power supply voltage that is a potential difference between the electric potential of the third power supply terminal VDD and the electric potential of the first power supply terminal VSS1.

In other words, the charge/discharge control circuit 10, which includes the connection circuit 14, is capable of running the controller 12 even when no electric potential is supplied from one of the first power supply terminal VSS1 and the second power supply terminal VSS2.

The controller 12 can also operate despite an abnormality in the second secondary battery B2, for example, the falling off of or an internal open circuit failure in the second secondary battery B2 because the first secondary battery B1 supplies a power supply voltage to the controller 12 in that event.

Similarly, the controller 12 can operate on a power supply voltage that is supplied by the second secondary battery B2 when a conductive wire of the first secondary battery B1 breaks, or when there is an abnormality in the first secondary battery B1, for example, the falling off of or an internal open circuit failure in the first secondary battery B1.

As described above, even when an output wire from one of a plurality of secondary batteries connected in parallel breaks, the battery device 1 according to the first embodiment is capable of charging/discharging and monitoring another of the plurality of secondary batteries.

When the first secondary battery B1, for example, short-circuits internally, a large current accidentally flows into the second secondary battery B2 via the first secondary battery B1 and the control switches or the connection circuit 14.

In this case, the resistance value of the connection circuit 14 is set to a resistance value that is higher than the ON resistance value of the control switches and high enough to satisfactorily limit the amount of current that flows via the connection circuit 14. This causes most of the current to flow via the control switches. In addition, the high resistance value keeps satisfactorily limiting the amount of current flowing in the connection circuit 14 after the charge/discharge control circuit 10 detects the overcurrent and switches off the charge switches, thereby preventing damage to the charge/discharge control circuit 10.

Damage to the charge/discharge control circuit 10 is similarly prevented when the second secondary battery B2 short-circuits internally.

Another effect is that the voltage of the first secondary battery B1 and the voltage of the second secondary battery B2 can be balanced because the first secondary battery B1 and the second secondary battery B2 are connected to each other via the first resistor 141 and the second resistor 142 even when, for example, the discharge control switches are switched off in an over-discharge state.

Second Embodiment

A charge/discharge control circuit 10 according to the second embodiment of the present invention is described below. The charge/discharge control circuit 10 according to the second embodiment is configured similarly to the charge/discharge control circuit 10 according to the first embodiment, except for points described later. Descriptions on components that are the same as those of the charge/discharge control circuit 10 according to the first embodiment are thus omitted.

Figure 2:
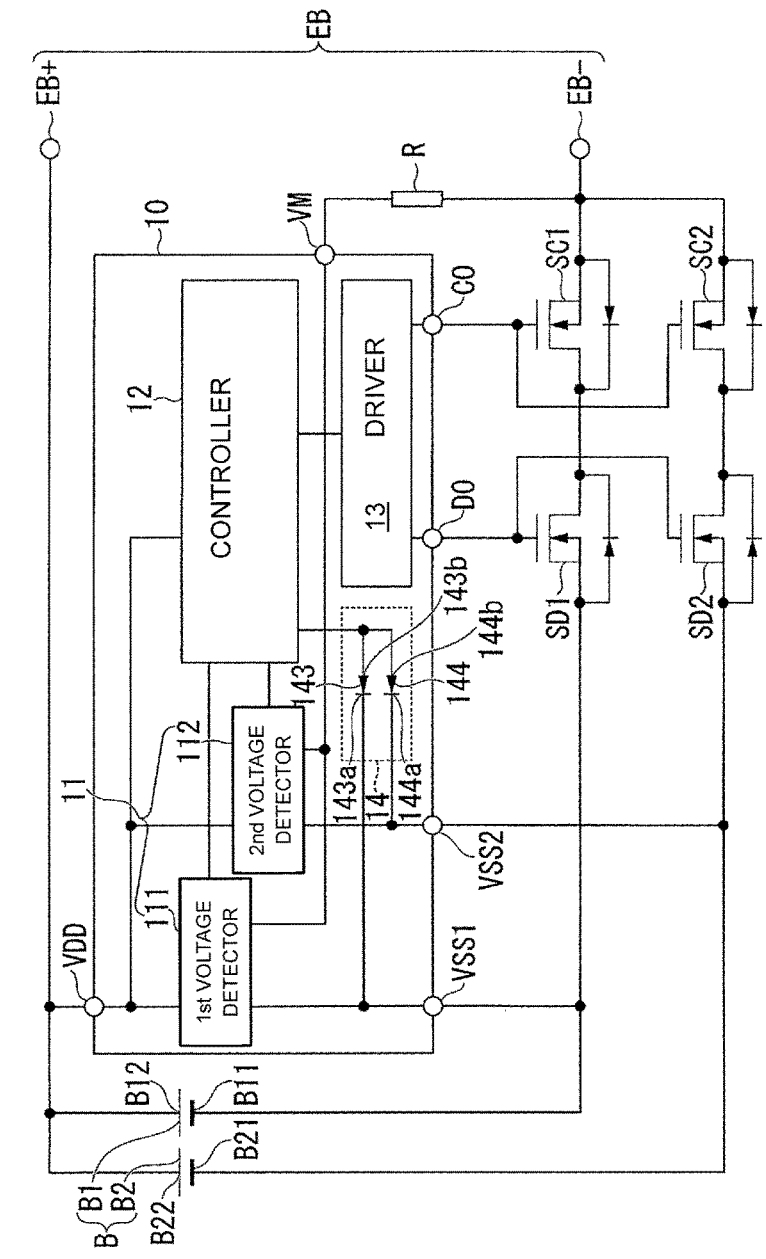
FIG. 2 is a diagram for illustrating a functional configuration of a battery device to which a charge/discharge control circuit according to the second embodiment of the present invention is applied.

FIG. 2 is a diagram for illustrating the function configuration of a battery device 1 to which the charge/discharge control circuit 10 according to the second embodiment is applied.

The connection circuit 14 includes a first diode 143 and a second diode 144. The first diode 143 includes a cathode terminal 143a and an anode terminal 143b. The second diode 144 includes a cathode terminal 144a and an anode terminal 144b. In the first diode 143, the cathode terminal 143a is connected to the first power supply terminal VSS1 and the anode terminal 143b is connected to the controller 12. In the second diode 144, the cathode terminal 144a is connected to the second power supply terminal VSS2 and the anode terminal 144b is connected to the controller 12.

With the connection circuit 14 configured as above, the battery device 1 according to the second embodiment is capable of, even when an output wire from one of a plurality of secondary batteries connected in parallel breaks, charging/discharging and monitoring another of the plurality of secondary batteries as in the first embodiment.

The charge/discharge control circuit 10 is also free from damage when one of the first secondary battery B1 and the second secondary battery B2 short-circuits internally, because a current does not flow from the short-circuited secondary battery B via the connection circuit 14.

Third Embodiment

A charge/discharge control circuit 10 according to the third embodiment of the present invention is described below. The charge/discharge control circuit 10 according to the third embodiment is configured similarly to the charge/discharge control circuit 10 according to the first embodiment, except for points described later. Descriptions on components that are the same as those of the charge/discharge control circuit 10 according to the first embodiment are thus omitted.

Figure 3:
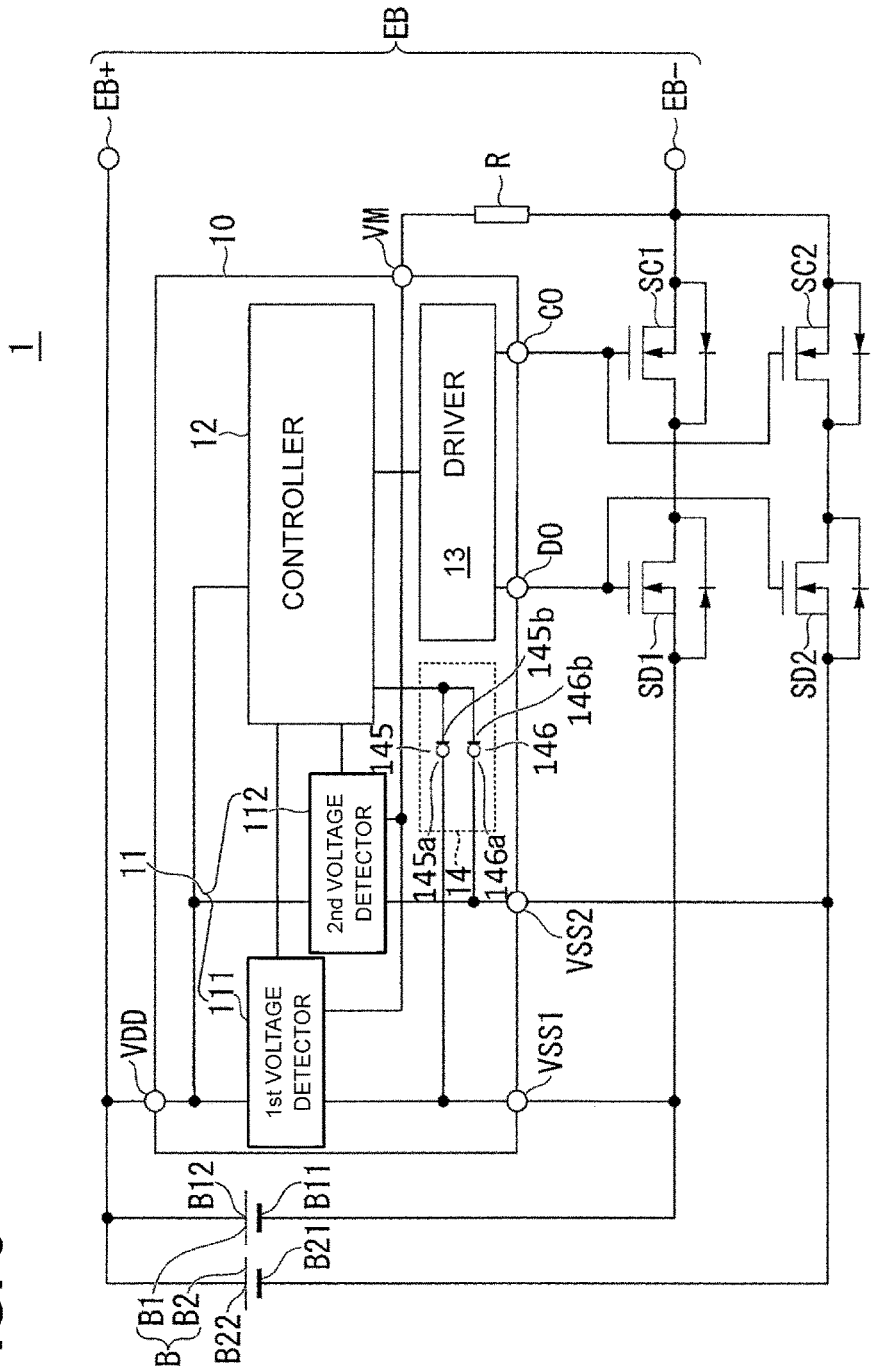
FIG. 3 is a diagram for illustrating a functional configuration of a battery device to which a charge/discharge control circuit according to the third embodiment of the present invention is applied.

FIG. 3 is a diagram for illustrating the function configuration of a battery device 1 to which the charge/discharge control circuit 10 according to the third embodiment is applied.

The connection circuit 14 includes a first constant current diode 145 and a second constant current diode 146. The first constant current diode 145 includes an anode terminal 145a and a cathode terminal 145b. The second constant current diode 146 includes an anode terminal 146a and a cathode terminal 146b. In the first constant current diode 145, the anode terminal 145a is connected to the first power supply terminal VSS1 and the cathode terminal 145b is connected to the controller 12. In the second constant current diode 146, the anode terminal 146a is connected to the second power supply terminal VSS2 and the cathode terminal 146b is connected to the controller 12.

With the connection circuit 14 configured as above, the battery device 1 according to the third embodiment is capable of, even when an output wire from one of a plurality of secondary batteries connected in parallel breaks, charging/discharging and monitoring another of the plurality of secondary batteries as in the first embodiment.

When an internal short-circuit occurs in the first secondary battery B1, for example, the amount of current flowing in the connection circuit 14 is limited by a pinch-off voltage of the first constant current diode 145. Damage to the charge/discharge control circuit 10 is thus prevented by setting the pinch-off voltage to an appropriate value. Damage to the charge/discharge control circuit 10 is similarly avoided when the second secondary battery B2 short-circuits internally.

Another effect is that the voltage of the first secondary battery B1 and the voltage of the second secondary battery B2 can be balanced as in the first embodiment, because the first secondary battery B1 and the second secondary battery B2 are connected to each other via the first constant current diode 145 and the second constant current diode 146 even when the discharge control switches are switched off in an over-discharge state.

This concludes the descriptions on the embodiments of the present invention. The present invention is not limited to the configurations of the embodiments, and is receptive of omission, substitution, and modification in various manners without departure from the spirit of the present invention. For example, while the battery devices described in the embodiments each have charge/discharge switches on the negative electrode side of the secondary batteries and give the secondary batteries a common positive electrode, the battery device may instead have charge/discharge switches on the positive electrode side of the secondary batteries and give the secondary batteries a common negative electrode. To give another example, the discharge control switch SD1 and the discharge control switch SD2, which are configured to have common control, and the charge control switch SC1 and the charge control switch SC2, which are configured to have common control, may have a circuit configuration designed so that each control switch is controlled individually.

What is claimed is:

1. A charge/discharge control circuit configured to control charging/discharging of a first secondary battery and a second secondary battery which are connected in parallel to each other between a first external terminal and a second external terminal, the charge/discharge control circuit comprising:
   a first power supply terminal to which a first electrode of the first secondary battery is connected;
   a second power supply terminal to which a first electrode of the second secondary battery is connected;
   a third power supply terminal to which a second electrode of the first secondary battery and a second electrode of the second secondary battery are connected;
   a first voltage detector configured to detect a voltage of the first secondary battery based on an electric potential of the first power supply terminal and an electric potential of the third power supply terminal;
   a second voltage detector configured to detect a voltage of the second secondary battery based on an electric potential of the second power supply terminal and the electric potential of the third power supply terminal;
   a connection circuit configured to connect the first power supply terminal and the second power supply terminal to generate an electric potential for an output; and
   a controller configured to operate on a power supply voltage that is a potential difference between the electric potential output from the connection circuit and the electric potential supplied from the third power supply terminal, and to control charging/discharging of the first secondary battery and the second secondary battery based on a result of detection by the first voltage detector and a result of detection by the second voltage detector.

2. The charge/discharge control circuit according to claim 1, wherein the connection circuit comprises:
   a first resistor including a first terminal connected to the first power supply terminal and a second terminal connected to the controller; and
   a second resistor including a first terminal connected to the second power supply terminal and a second terminal connected to the controller.

3. The charge/discharge control circuit according to claim 1, wherein the connection circuit comprises:
   a first diode including a cathode terminal connected to the first power supply terminal and an anode terminal connected to the controller; and
   a second diode including a cathode terminal connected to the second power supply terminal and an anode terminal connected to the controller.

4. The charge/discharge control circuit according to claim 1, wherein the connection circuit comprises:
   a first constant current diode including an anode terminal connected to the first power supply terminal and a cathode terminal connected to the controller; and
   a second constant current diode including an anode terminal connected to the second power supply terminal and a cathode terminal connected to the controller.

5. A battery device, comprising:
   the charge/discharge control circuit of claim 1;
   the first secondary battery;
   the second secondary battery;
   the first external terminal;
   the second external terminal;
   a first charge/discharge control switch controlled by the controller and configured to control a charge/discharge current to/from the first secondary battery; and a second charge/discharge control switch controlled by the controller and configured to control a charge/discharge current to/from the second secondary battery.

6. A battery device, comprising:
the charge/discharge control circuit of claim 2;
the first secondary battery;
the second secondary battery;
the first external terminal;
the second external terminal;
a first charge/discharge control switch controlled by the controller and configured to control a charge/discharge current to/from the first secondary battery; and
a second charge/discharge control switch controlled by the controller and configured to control a charge/discharge current to/from the second secondary battery.

7. A battery device, comprising:
the charge/discharge control circuit of claim 3;
the first secondary battery;
the second secondary battery;
the first external terminal;
the second external terminal;
a first charge/discharge control switch controlled by the controller and configured to control a charge/discharge current to/from the first secondary battery; and
a second charge/discharge control switch controlled by the controller and configured to control a charge/discharge current to/from the second secondary battery.

8. A battery device, comprising:
the charge/discharge control circuit of claim 4;
the first secondary battery;
the second secondary battery;
the first external terminal;
the second external terminal;
a first charge/discharge control switch controlled by the controller and configured to control a charge/discharge current to/from the first secondary battery; and
a second charge/discharge control switch controlled by the controller and configured to control a charge/discharge current to/from the second secondary battery.

* * * * *